US006893563B2

(12) United States Patent
Grummert

(10) Patent No.: US 6,893,563 B2
(45) Date of Patent: May 17, 2005

(54) CROSS-FLOW FILTER WITH SELF-REGULATING TRANSMEMBRANE PRESSURE

(75) Inventor: Ulrich Grummert, Bad Sooden Allendorf (DE)

(73) Assignee: Sartorius AG, Goettingen (DE)

(*) Notice: Subject to any disclaimer, the term of this patent is extended or adjusted under 35 U.S.C. 154(b) by 219 days.

(21) Appl. No.: 10/297,907

(22) PCT Filed: May 30, 2001

(86) PCT No.: PCT/EP01/06157
§ 371 (c)(1),
(2), (4) Date: Dec. 10, 2002

(87) PCT Pub. No.: WO01/96002
PCT Pub. Date: Dec. 20, 2001

(65) Prior Publication Data
US 2003/0136722 A1 Jul. 24, 2003

(30) Foreign Application Priority Data
Jun. 10, 2000 (DE) ......................... 100 28 908

(51) Int. Cl.⁷ ............................. B01F 63/08
(52) U.S. Cl. .................... 210/321.84; 210/433.1
(58) Field of Search .................. 210/321.72–321.9, 210/321.6, 433.1

(56) References Cited

U.S. PATENT DOCUMENTS

| | | | | | |
|---|---|---|---|---|---|
| 2,364,366 A | * | 12/1944 | Jahreis | .................. | 210/229 |
| 4,159,250 A | * | 6/1979 | Schnell | .................. | 210/232 |
| 4,310,416 A | * | 1/1982 | Tanaka et al. | ......... | 210/321.75 |
| 4,867,876 A | * | 9/1989 | Kopf | .................. | 210/228 |
| 5,096,591 A | * | 3/1992 | Benn | .................. | 210/651 |
| 5,137,637 A | * | 8/1992 | Korin | .................. | 210/634 |
| 5,275,726 A | * | 1/1994 | Feimer et al. | ......... | 210/321.74 |
| 5,525,144 A | | 6/1996 | Gollan | | |
| 5,868,930 A | * | 2/1999 | Kopf | .................. | 210/321.75 |
| 6,368,505 B1 | * | 4/2002 | Grummert et al. | ..... | 210/321.84 |

FOREIGN PATENT DOCUMENTS

| | | |
|---|---|---|
| DE | 3441249 A1 | 5/1985 |
| JP | 08010587 A | 1/1996 |
| JP | 200051668 A | 2/2000 |

* cited by examiner

Primary Examiner—David L. Sorkin
(74) Attorney, Agent, or Firm—Chernoff, Vilhauer, McClung & Stenzel, LLP

(57) ABSTRACT

Cross-flow filters having improved uniformity in transmembrane pressures and consequent much greater flux are provided by the installation of barriers in permeate channels.

13 Claims, 4 Drawing Sheets

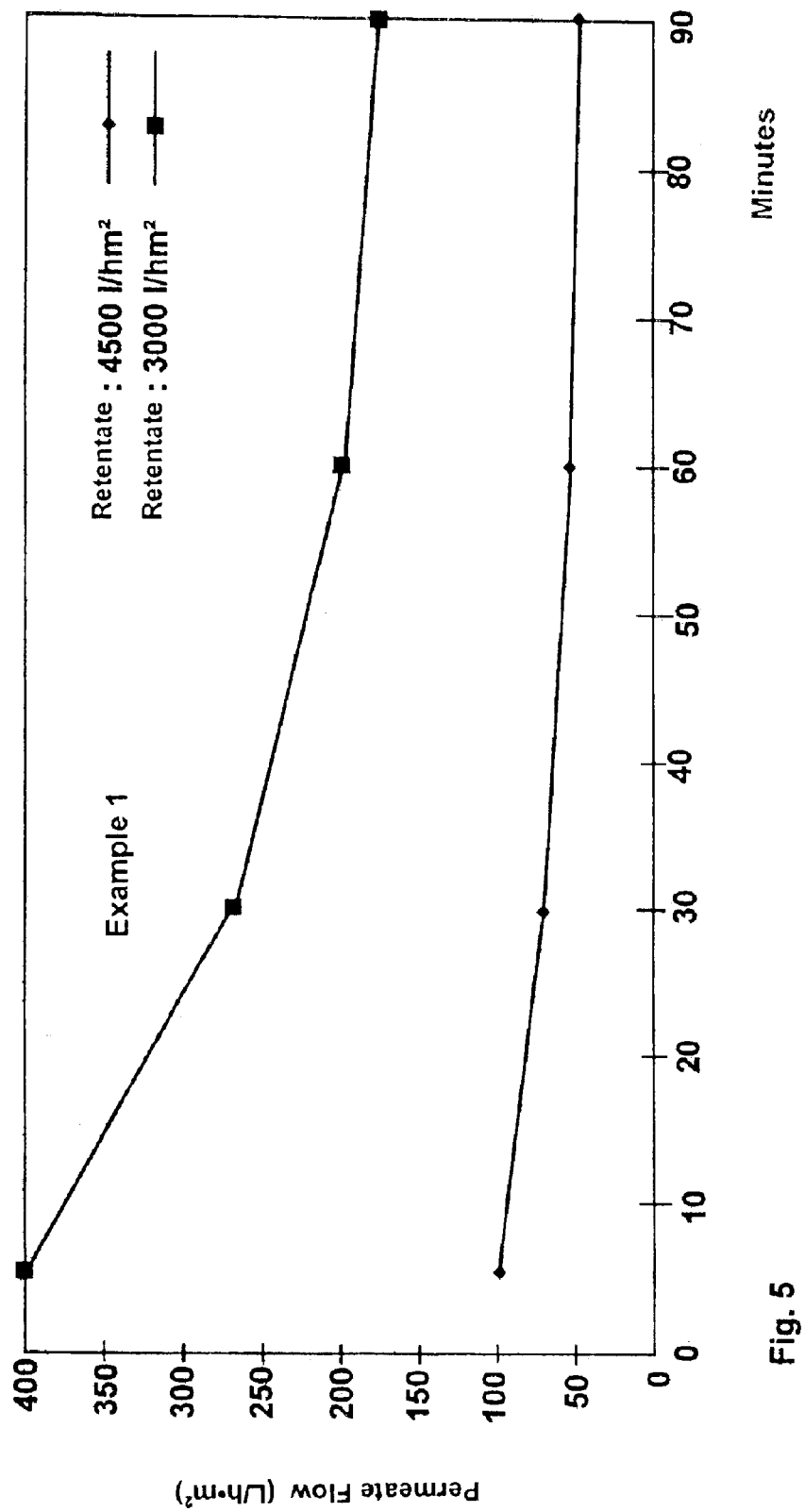

US 6,893,563 B2

CROSS-FLOW FILTER WITH SELF-REGULATING TRANSMEMBRANE PRESSURE

This is a Section 371 national phase application of PCT/EP 01/06157, and claims priority of DE 100 28 908.8 filed Jun. 10, 2000.

REFERENCE TO RELATED APPLICATIONS

This disclosure claims the benefit of the filing date of International Application No. PCT/EP02/07403, having an international filing date of Jul. 4, 2002, which designated the United States of America, and this disclosure is the United States national stage of that international application. This disclosure further claims priority to Germany patent application 101 33 104.5, filed Jul. 12, 2001.

BACKGROUND OF THE INVENTION

In cross-flow filtration, a feed liquor to be filtered flows through an overflow channel, whereby the feed is directed against the surface of the filter element tangentially. The filter splits the feed into a concentrate (retentate) and a filtrate (permeate). The filter element is generally a polymeric microporous membrane with pores sized so as to be capable of ultrafiltration or microfiltration. Average pore sizes for an ultrafiltration membrane, typically characterized by an exclusion threshold, make possible the retention of macromolecules ranging from 500 to 1,000,000 Daltons, while those for a microfiltration membrane are in the range of 0.01 to 10 $\mu$m. The subjects of exclusion thresholds and average pore sizes and their determination are discussed in Scheuermnann, *Handbook of Industrial Solids/Liquids Filtration* (1990) at pages 250–262.

The retentate is diverted onto the overflow surface of the filter membrane and may be recycled to flow over the same surface again, thus providing for repeated permeate passes. The permeate permeates the filter membrane in a direction substantially perpendicular thereto and is collected below the filter element in a permeate channel and is conducted away from the filtration device. The target substance can be in the permeate and/or in the retentate. Cross-flow filtration devices may have one or more overflow channels. See DE A1 196 36 006 and DE PS 34 41 249. Devices with a multiplicity of overflow channels are mainly in the form of filter cassettes, as disclosed in DE PS 34 41 249. The cassettes consist of a plurality of adjacent filter cells, which, as a rule, are constructed from alternatingly positioned, flat sections of a passage forming an overflow channel for the feed, a first membrane array, a permeate holder for the formation of a filtrate channel, and a second membrane array. Each overflow opening is in fluid communication with an inlet for the feed and with an outlet for the retentate. Each permeate channel is in fluid communication with a permeate outlet.

As retentate is captured it begins to build up and tends to obstruct the pores of the filter element, but by virtue of its tangential flow over the filter's surface, is flushed from the surface, so that the filter's pores are freed for permeation of the feed. In spite of this, for various reasons a layer builds up on the surface of the filter element. Because of this, as a rule, the filtration capacity as well as the operational life of cross-flow filtration devices are diminished.

It is therefore a primary goal of the invention to provide a cross-flow filtration device that avoids the foregoing problem and that exhibits an improved filtration capacity and a substantial operational life.

BRIEF SUMMARY OF THE INVENTION

In accord with the invention, the permeate channels of a cross-flow filtration device are provided with barriers. These barriers are placed at a distance away from the permeate outlet so as to impede or block the flow of permeate, resulting in the maintenance of a more uniform transmembrane pressure. The inventive cross-flow filtration device achieves a degree of permeate flow that is much greater than that delivered by state-of-the-art devices with a minimum of energy input, that is to say, with relatively small feed velocities over the surface of the filter element.

Fluids which may be filtered with the inventive cross-flow filtration devices include emulsions, suspensions, beer, wine, juice, water, milk, whey, and brewers wort. The devices can be applied to the filtration of process and waste waters, to solutions in the fields of pharmaceuticals, medicine, cosmetics, chemistry, biotechnology, gene technology, environmental control and in the laboratory. They can be employed for the recovery of valuable materials and for separation of substances such as the separation of macromolecules and bio-molecules. They can also be used for depyrogenation and for sterilization of solutions, for the separation of damaging materials from solutions, for the separation of microorganisms such as bacteria, yeasts and viruses and for the separation of cell components. Other applications include the desalting of protein solutions and other biological media.

BRIEF DESCRIPTION OF THE SEVERAL VIEWS OF THE DRAWINGS

FIG. 5 is a graph showing the course of a filtration with the inventive device.

DETAILED DESCRIPTION OF THE PREFERRED EMBODIMENTS

Figure 1:
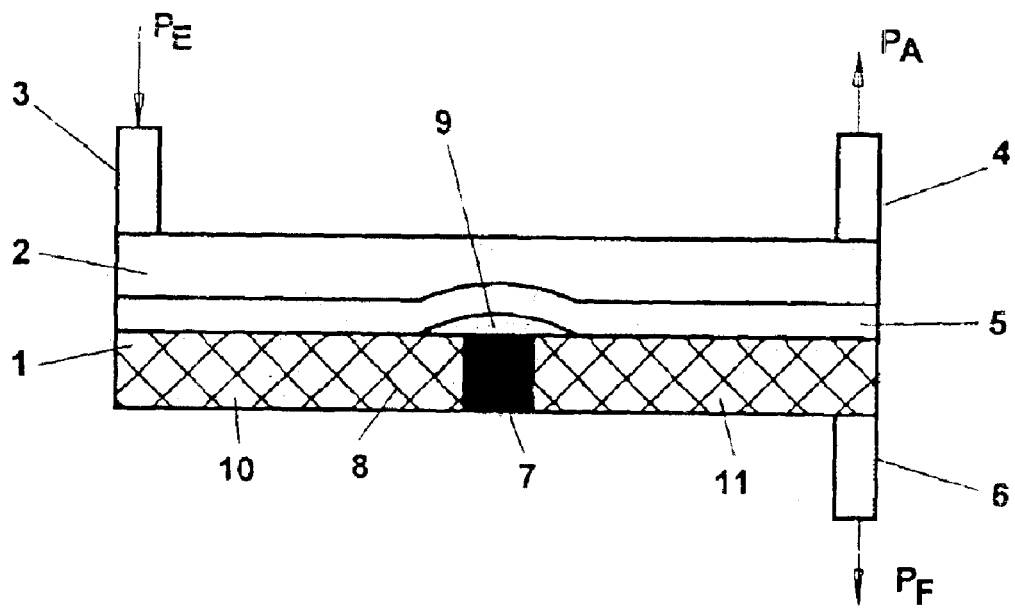
FIG. 1 is a schematic longitudinal cross-sectional view of an exemplary embodiment of the invention.
Figure 2:
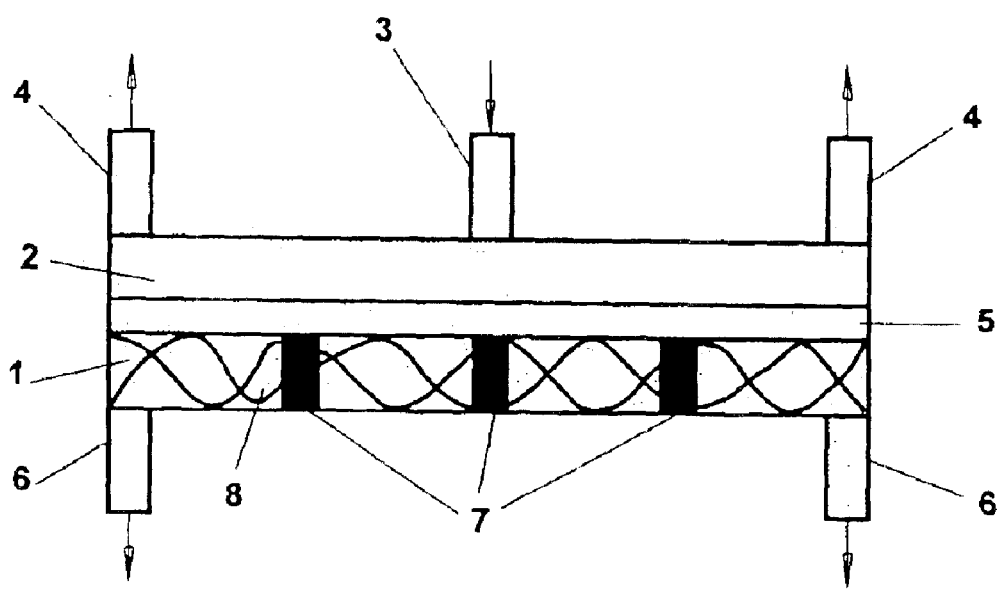
FIG. 2 is a schematic longitudinal cross-sectional view of another exemplary embodiment of the invention.
Figure 3:
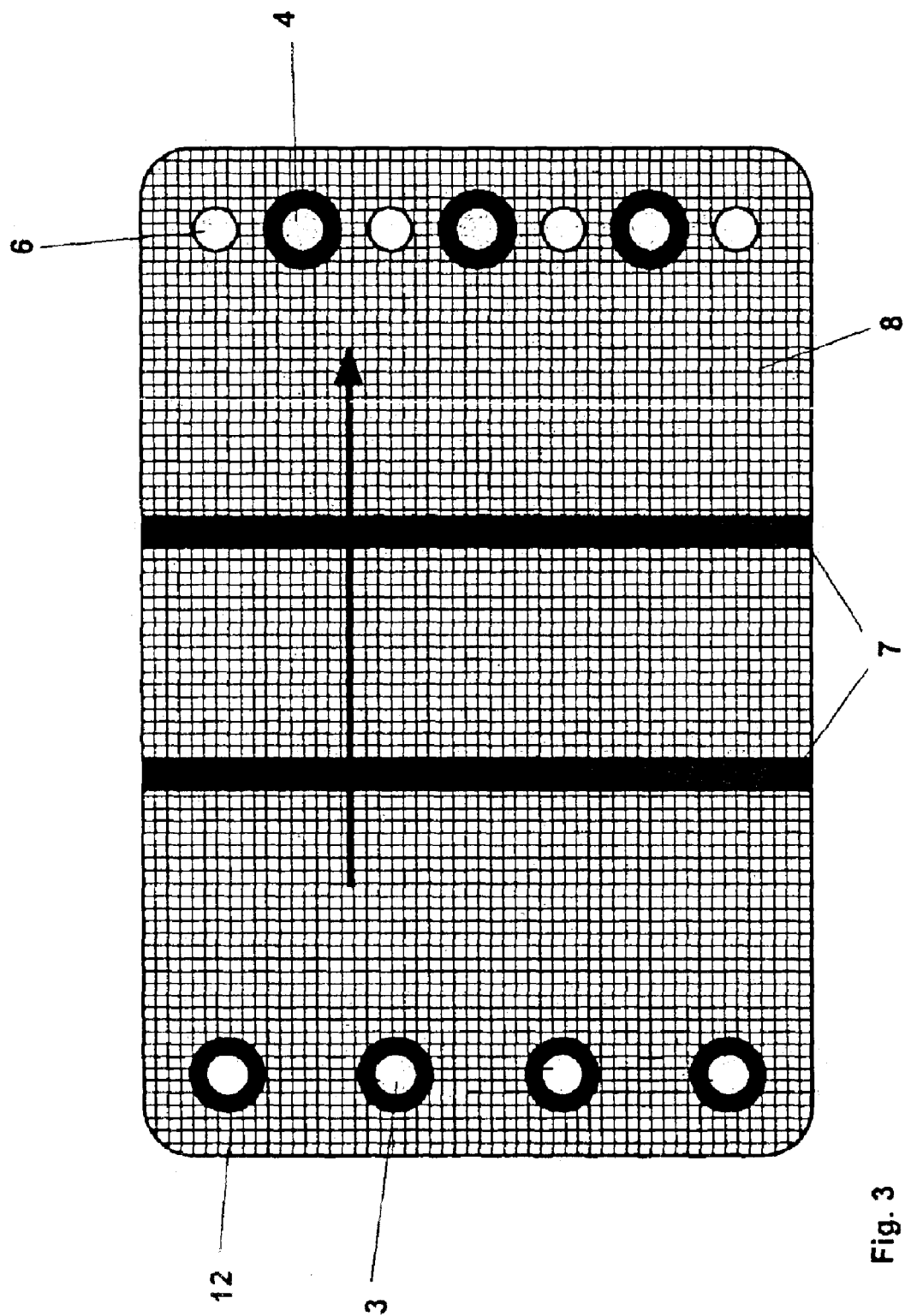
FIG. 3 is a top view of a spacer element having two barriers.
Figure 4:
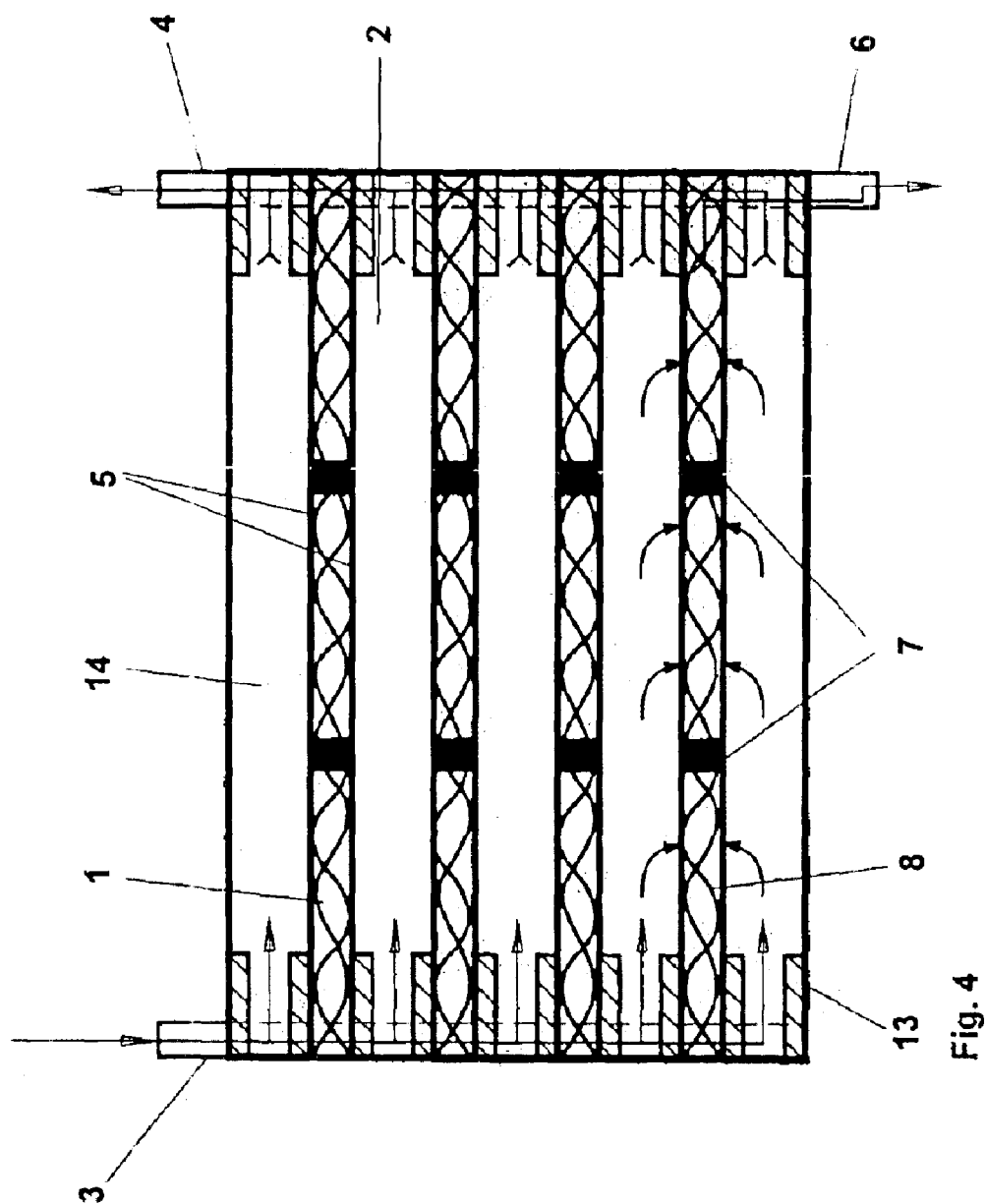
FIG. 4 is a schematic longitudinal cross-sectional view of yet another exemplary embodiment of the invention with a plurality of overflow and permeate channels.

Referring to the drawings, wherein like numerals generally refer to the same elements, there is shown in FIGS. 1–2 and 4 the inventive cross-flow filter with permeate channel 1 and overflow channel 2, the latter being in fluid communication with feed inlet 3 and retentate outlet 4. Permeate channel 1 and overflow channel 2 are separated from one another by a flexible filter element 5, and permeate channel 1 is in fluid communication with permeate outlet 6. Although feed inlet 3 and retentate outlet 4 are placed as far as possible from each other, retentate outlet 4 and permeate outlet 6 are proximal to one another. Barriers 7 are located in permeate channels 1 distal to permeate outlets 6, which spacing obstructs permeate flow to the permeate outlets. Barriers 7 may be components of spacers 8, which for example, may be in the form of webbing (FIG. 1), nonwoven fabric (FIG. 2) or woven fabric (FIG. 3).

In FIG. 1 the cross-flow filter is depicted during filtration, wherein the filter element 5 has yielded to form a flowover passage 9 for the permeate, allowing flow from the first section 10 of the permeate channel 1 into the second section 11 of the same channel. FIG. 3 is a plan view showing detail of spacer 8 in the form of a woven fabric with two barriers 7; such spacers 8 are shown integrated into a filter cassette in FIG. 4. Sealant 12 surrounds feed inlets 3 and retentate outlets 4, thereby preventing the influx of feed liquor and retentate into permeate channel 1 through spacer 8. Permeate outlets 6 need no sealant.

The filter cassette shown in FIG. 4 is a so-called wide open module, characterized by spacer supports 13 on both ends of spacers 8.

Transmembrane pressure (TMP) in the cross-flow filter is defined by the mathematical expression I as follows:

$$TMP = [(P_E + P_A)/2] - P_F \quad (I)$$

where $P_E$=pressure at the inlet of the overflow channel, $P_A$=pressure at the outlet of the overflow channel, and $P_F$=pressure at the outlet of the permeate channel.

If a cross-flow filtration device wherein the outlet of the permeate channel is in proximity to the outlet of the overflow channel is operated, for example, at $P_E$=3 bar, $P_A$=1 bar, and $P_F$=1 bar, then the nominal transmembrane pressure is 1 bar. However, in the vicinity of the inlet, TMP would typically be closer to 3 bar, allowing substantially greater quantity of permeate to pass through the filter element, thereby causing a greater quantity of materials from the feed liquor to collect on the surface of the filter element in the inlet zone, leading to rapid diminishment of the filtering capacity of the filter element in the inlet zone. Assuming a linear relationship, the drop or increase in pressure between the inlets and outlets of the overflow channels or permeate channels, upon placement of a barrier 7 at the mid-point of the permeate channel (FIG. 1) would result in TMP=0.5 at the above-mentioned operating pressures. Furthermore, this TMP exists at the outlet of the filtering device, in its mid-section, and also at the barrier 7. From the feed inlet 3 up to the barrier 7 (section 10 in FIG. 1) TMP may be calculated from equation I as 0.5 bar, where $P_E$=3 bar, $P_{A\ z(at\ the\ top\ of\ the\ barrier)}$=2 bar and $P_{F(at\ the\ barrier)}$=2 bar. From the top of the barrier 7 to the outlet 6 (Section 11 in FIG. 1), TMP is calculated from equation I as 0.5 bar, where $P_{E(at\ the\ top\ of\ the\ barrier)}$=2 bar, $P_A$=1 bar and $P_F$=1 bar.

The assumption is that where filtrate flow in a section upstream of barrier 7 (section 10 in FIG. 1) is restricted or obstructed, then the permeate pressure in that section will be less than the feed pressure in the overflow channel at the top of the barrier. Should the permeate pressure in section 10 exceed this assumed lower pressure, then the flexible filter will yield to the pressure and be pushed away from spacer 8 to either create or enlarge a flowover passage 9 for the permeate, whereby it is allowed to flow into the section downstream the barrier (section 11 of FIG. 1). If the pressure in section 10 of the permeate channel returns to the pressure in the overflow channel at the top of barrier 7, then the flexible filter relaxes, thereby closing or diminishing flowover passage 9 and preventing or diminishing further passage of the permeate over barrier 7. Thus, barriers 7 in conjunction with flexible filters 5 in the permeate channels act much like self-regulating pressure valves.

The permeate channel of the inventive filtration device should be provided with at least one barrier. However, more than one barrier may be provided, spaced evenly or unevenly. Advantageously, a barrier is placed transverse to the direction of permeate flow. The barriers are substantially impermeable to the permeate liquid, permitting substantially no convective material transport therethrough. Barriers can and preferably do extend over the entire width of the permeate channel, as shown in FIG. 3, but it may also have a smaller width and/or height than the permeate channel. In the case of multiple barriers, these may be sized the same or differently, but equal longitudinal dimensions are preferred to achieve uniform pressure relationships. Experience with the inventive filters has shown that when the barriers extend over the entire width of the permeate channel(s), increased permeate flow can be achieved with barriers having a height of as little as about one-half that of the permeate channel. At a height of about two-thirds that of the permeate channel, increased flux can be observed immediately.

The most effective barrier is one which extends over the entire height and width of the permeate channel, whereby the barrier totally blocks the permeate channel under non-pressure conditions. In the case of a barrier that is about one-third the height of the permeate channel and is the same width as the permeate channel, practically no effect can be observed. On this account it is preferred that the barriers extend over the entire cross-section of the permeate channel.

Depending upon the size of the cross-flow filtration device, barriers are preferably up to about 10 mm in thickness. When the filter element is reinforced by packing the permeate channel with uniformly distributed, permeable spacing material, it is advantageous to incorporate the barriers as components of such spacing material. Advantageously the spacing material can be a textile (a woven fabric, a webbed material, a non-woven fabric or a lattice) which contains the barrier; a woven fabric is preferred. For the filter element, polymeric membranes are preferred because these have the flexibility required to deform under pressure so as to form the flowover passage. In a preferred embodiment, the filter device is provided with a multiplicity of overflow and permeate channels in alternating sequence. Particularly favored are devices constructed in the form of filter cassettes. The barrier can be constructed of either a rigid or a flexible material, but are preferably composed of elastic polymers such as durable silicone.

In the Examples which follow cross-flow filtration took place in a Sartocon® 2Plus filter cassette of substantially the same design shown in FIG. 4 (from Sartorius AG of Goettingen, Germany). The cassette was provided with 32 hydrophilic microporous membranes of crosslinked cellulose hydrate with an average pore size of 0.6 µm (Hydrosart® from Sartorius AG), 16 permeate channels packed with a woven fabric 450 µm thick, and 17 overflow channels for feed with a woven fabric 610 µm thick employed as a spacer therein. The woven fabrics in the overflow channels were covered in the edge areas with spacer supports 50 µm thick. The membrane surface area available for filtration was 0.6 m². A 20% yeast solution was filtered at 25° C. The pressure $P_E$ at the inlet of the overflow channels was 4 bar, while the pressures at the outlets for of the overflow channels $P_A$ and at the outlets of the permeate channels $P_F$ were both 0 bar.

EXAMPLE 1

The above-described filter cassette was provided with spacers placed midway in the permeate channels and aligned transversely to the flow direction of the feed. Each permeate channel 1 was equipped with barrier 7 of durable elastic silicone 10 mm thick and having a height equal to the thickness of the spacer fabric (which was also the height of the permeate channel 1). Five minutes after the start of the filtration, the permeate flow was measured at 400 L/h•m²; after 90 minutes it was about 170 L/h•m².

Comparative Example

The filter cassette of Example 1 was used for the same filtration conducted in Example 1, but not provided with any barriers. The following permeate flows were achieved: after five minutes about 1100 L/h•m²; after 90 minutes about 50 L/h•m².

FIG. 5 is a graph of the filtrate flow in L/h•m² versus time of filtration in minutes from Example 1 and the Comparative Example. The upper curve is from the data of Example 1.

EXAMPLE 2

Filter cassettes of substantially the same design as that of Example 1 were used to conduct filtration on a 10% yeast solution with the following changes: different sized barriers were used; the cassettes were provided with 14 membranes, 7 permeate channels and 8 overflow channels; the surface area available for filtration was 0.3 m²; and the membrane had an average pore size of 0.45 μm. To determine what influence the height of the barrier (which had the same width as the permeate channel) had on permeate flow, three cassettes A, B and C were provided with variances in the barrier element as follows:

in device A, one barrier was placed in each permeate channel at the mid-point, the height of which was two-thirds the height of the permeate channel;

in device B, one barrier was placed in each permeate channel at the mid-point, the height of which was one-third the height of the permeate channel; and in device C, no barriers were provided.

Pressure values were $P_E$=3 bar and $P_A$=$P_F$=0 bar. After about 30 minutes of filtration, a substantially constant permeate flow was established and the permeate and retentate flows were measured. The results are given in Table 1.

TABLE 1

| Flow (L/h · m²) | Device A | Device B | Device C |
| --- | --- | --- | --- |
| Permeate | 120 | 86 | 88 |
| Retentate | 1760 | 1800 | 2200 |

From the data in Table 1, the much greater permeate flow in Device A is apparent, while the permeate flows for Devices B and C were substantially the same.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a cross-flow filtration device comprising at least one permeate channel (1) for the collection of permeate and parallel to at least one overflow channel (2) wherein each overflow channel (2) is separated from each permeate channel (1) by a flexible polymeric membrane filter element (5) and each overflow channel (2) has at least one inlet (3) for liquid feed and at least one retentate outlet (4) and each permeate channel (1) has at least one permeate outlet (6) and wherein each retentate outlet (4) and each permeate outlet (6) are placed close to one another, the improvement comprising providing each permeate channel (1) with at least one impermeable barrier (7) that covers at least a portion of the cross-sectional area of each permeate channel (1) and that is distal to permeate outlet (6) so as to create a discontinuous permeate channel, said membrane being capable of flexing during filtration so as to permit flow around said barrier.

2. The device of claim 1 wherein said at least one barrier is disposed transversely to the direction of flow of the permeate.

3. The device of claim 1 wherein said barrier extends substantially over the entire width of said permeate channel.

4. A device of claim 1 wherein said permeate channel is provided with two or more of said barriers, each of substantially the same size.

5. The device of claim 3 wherein said barrier has a height that is at least one-half the height of said permeate channel.

6. The device of claim 3 wherein said barrier has a height that is at least two-thirds the height of said permeate channel.

7. The device of claim 3 wherein said barrier has a height substantially equal to that of said permeate channel.

8. The device of claim 1 wherein said barrier is up to 10 mm thick.

9. The device of claim 1 wherein said barrier is a flexible material.

10. The device of claim 1 wherein each permeate channel is provided with a spacer (8) and said barrier is a component of said spacer (8).

11. The device of claim 10 wherein said spacer is a textile.

12. The device of claim 11 wherein said textile material is woven.

13. The device of claim 1 having a multiplicity of said permeate channels and overflow channels arranged in alternating succession.

* * * * *